(No Model.)
P. LISTEMAN.
CAR STARTER.
No. 356,593. Patented Jan. 25, 1887.
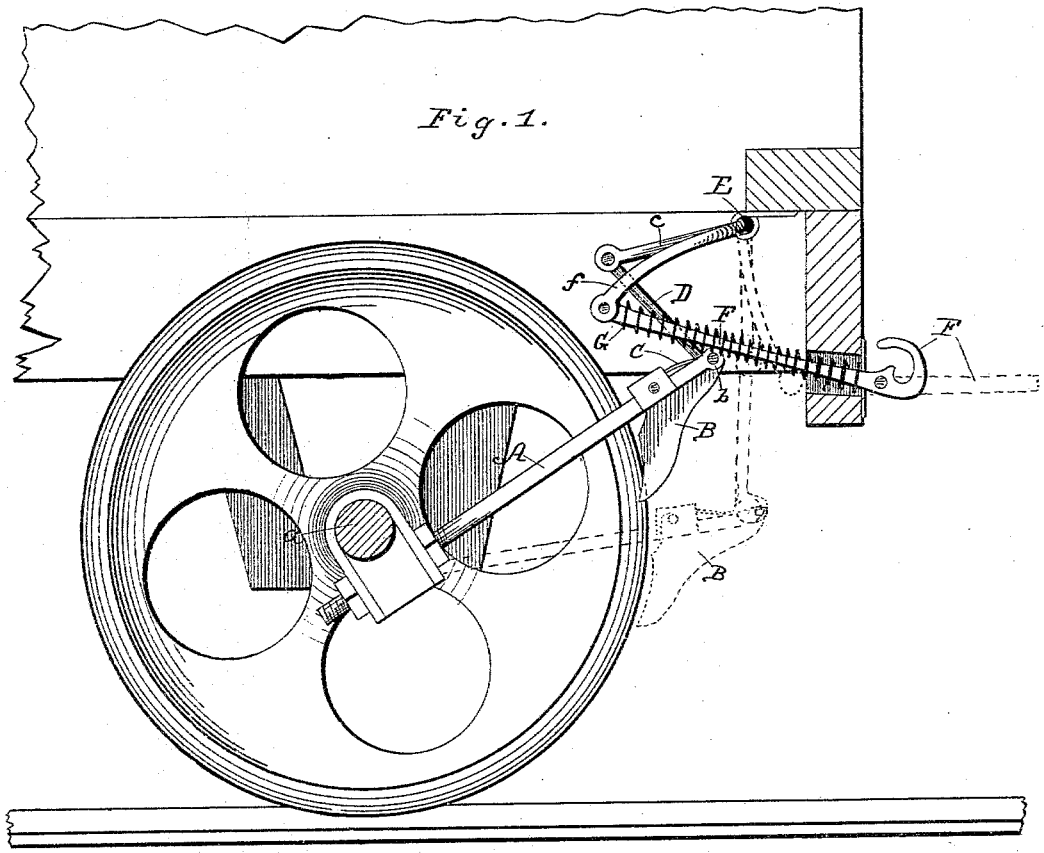
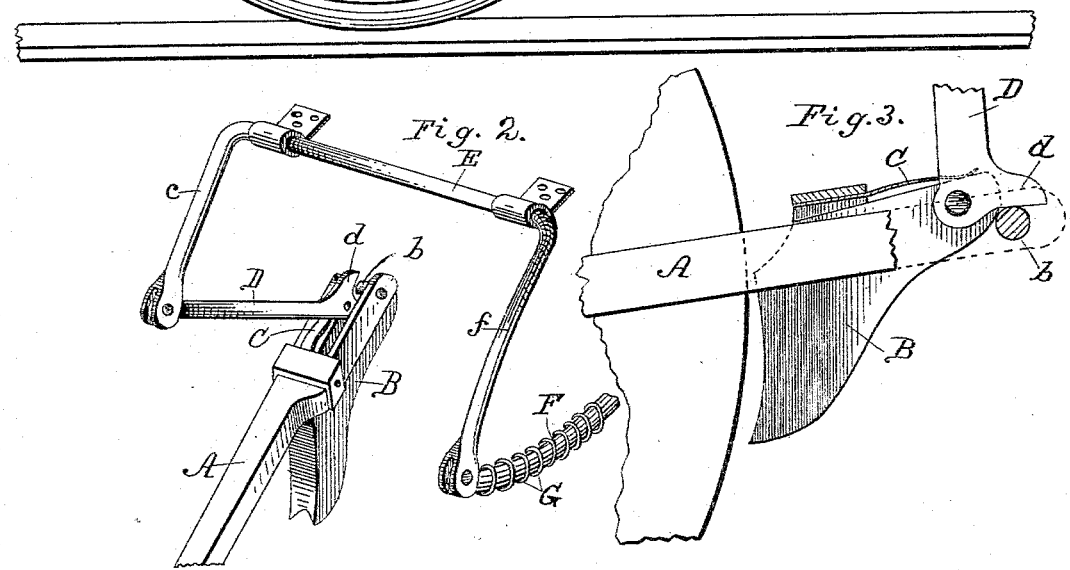
WITNESSES:
Thos. Houghton.
P. B. Turpin.
INVENTOR:
P. Listeman
BY Munn & Co
ATTORNEYS.

UNITED STATES PATENT OFFICE.

PHILLIP LISTEMAN, OF COLLINSVILLE, ILLINOIS.

CAR-STARTER.

SPECIFICATION forming part of Letters Patent No. 356,593, dated January 25, 1887.

Application filed February 18, 1886. Serial No. 192,443. (No model.)

*To all whom it may concern:*

Be it known that I, PHILLIP LISTEMAN, of Collinsville, in the county of Madison and State of Illinois, have invented a new and useful Improvement in Car-Starters, of which the following is a specification.

This invention is an improved car-starter, and has for an object to provide a simple and convenient construction by which the weight of the car may be utilized in starting the same, and by which the car may be started by far less force than is ordinarily required.

The invention consists in certain features of construction and novel combinations of parts, as will be described.

In the drawings, Figure 1 is a side view of a part of a car provided with my improvements, parts being broken away and motions being indicated in dotted lines. Fig. 2 is a perspective detail view of the starting devices, and Fig. 3 is a detail view illustrating the devices for releasing the pawl or clutch.

An arm, A, is pivoted approximately concentric with the car-wheel, and usually on the axle $a$ thereof. To this arm, near its outer end, I pivot a pawl or clutch, B, arranged to engage the periphery of the wheel. The arm is extended past its pivot with the pawl, and is provided with a lateral projection, $b$. The pawl is normally held in engagement with the wheel by a spring, C, which presses against and depresses the rear end of the pawl. A link, D, is pivoted to the pawl near the rear end of the same, and near such pivot the link is provided with a crank-like projection, $d$, which engages upon the projection $b$ of the arm A.

A shaft, E, is journaled to the car-framing, and has a crank, $c$, which connects with the link D. This shaft also has a second crank, $f$, which connects with the draft-attaching bar F, which may be formed as shown or of other suitable construction. A spring, G, is arranged to hold said bar normally in its extreme rearmost position.

The operation is simple and will be readily understood. When the parts are in the full-line position, Fig. 1, and draft is applied, the parts are moved to the dotted position, Fig. 1, the clutch or pawl binding against and turning the wheel as is desired. At the extreme lower position of the swinging arm the projection $d$ of the link engages the projection $b$ of the arm, and the pawl is raised against the action of its spring C, and so released from the car-wheel.

Manifestly the devices as before described might be applied to all of the wheels of a car when so desired.

Having thus described my invention, what I claim as new is—

1. The combination of the arm, the pawl or clutch pivoted thereto, and a link pivotally connected with one of such parts, and constructed and arranged to engage the other part in the operation of the device, whereby the pawl may be released at the desired time, substantially as set forth.

2. In a car-starter, the combination of the swinging arm provided with a pawl or clutch for engaging the wheel, a shaft having a crank connected with said arm, and the draft-bar connected with said shaft, whereby to rotate the same, substantially as set forth.

3. The combination, with the arm and the pawl or clutch pivoted thereto, of the link pivoted to the pawl and having a projection arranged to engage the arm, whereby the pawl may be released from the wheel in the operation of the device, substantially as set forth.

4. The combination of the swinging arm, the pawl or clutch pivoted thereto, a spring for normally holding said pawl in engagement with the wheel, the shaft having a crank, and a link connected with said crank and pivoted to the pawl and provided with a projection arranged to engage the arm, substantially as and for the purposes specified.

5. The combination of the pawl or clutch for engaging the wheel, the shaft having a crank connected therewith and provided with a second crank, and the draft-bar connected with said second shaft, substantially as set forth.

6. The combination of the car-wheel, the swinging arm having a pawl or clutch, the shaft having a crank, the connecting-link, and the draft-bar, substantially as set forth.

PHILLIP LISTEMAN.

Witnesses:
JOHN T. ABBOTT,
G. W. BLAKE.